United States Patent [19]

Lederman

[11] Patent Number: 5,147,139
[45] Date of Patent: Sep. 15, 1992

[54] MULTIPLE LIP SEAL ASSEMBLY WITH IMPROVED ACCURACY

[75] Inventor: Frederick E. Lederman, Sandusky, Ohio

[73] Assignee: General Motors Corporation, Detroit, Mich.

[21] Appl. No.: 824,128

[22] Filed: Jan. 22, 1992

[51] Int. Cl.$^5$ .................. F16C 33/78; F16C 33/76
[52] U.S. Cl. ..................... 384/486; 277/47; 277/95; 277/152; 384/477
[58] Field of Search ............ 384/477, 484–486; 277/47, 95, 152

[56] References Cited

U.S. PATENT DOCUMENTS

| | | | |
|---|---|---|---|
| 4,497,495 | 2/1985 | Christiansen | 277/50 |
| 4,572,516 | 2/1986 | Symons et al. | 277/50 |
| 4,958,942 | 9/1990 | Shimizu | 384/486 |

Primary Examiner—Thomas R. Hannon
Attorney, Agent, or Firm—Patrick M. Griffin

[57] ABSTRACT

A bearing seal assembly has a flexible radial and axial seal lip, each of which is paired with a stiff locating register. The body of the seal is molded to a metal casing indirectly, by a hinge that is flexible, but still stiffer than the seal lips. The seal casing is installed to one of the bearing races, and another seal casing is installed to the other bearing race to provide sealing surfaces that engaged by the sealing lips and abutted by the locating registers. The hinge assures that the more flexible seal lips are deflected into the sealing surfaces, but the stiffer registers flex the hinge to assure that the lips are not deflected more than desired when the seal casings are closer together.

3 Claims, 4 Drawing Sheets

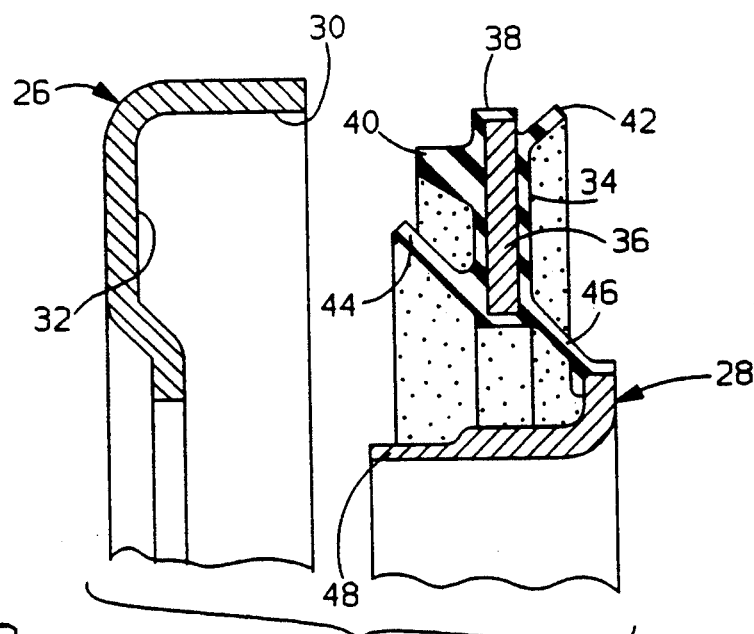
FIG.3
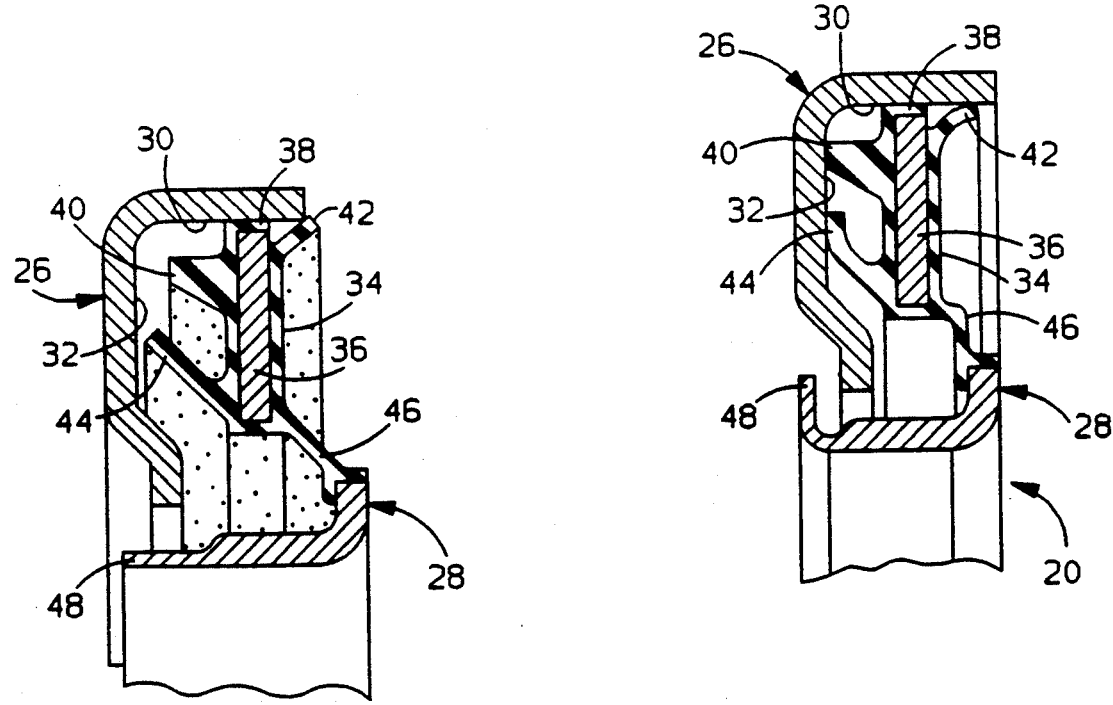
FIG.4
FIG.5

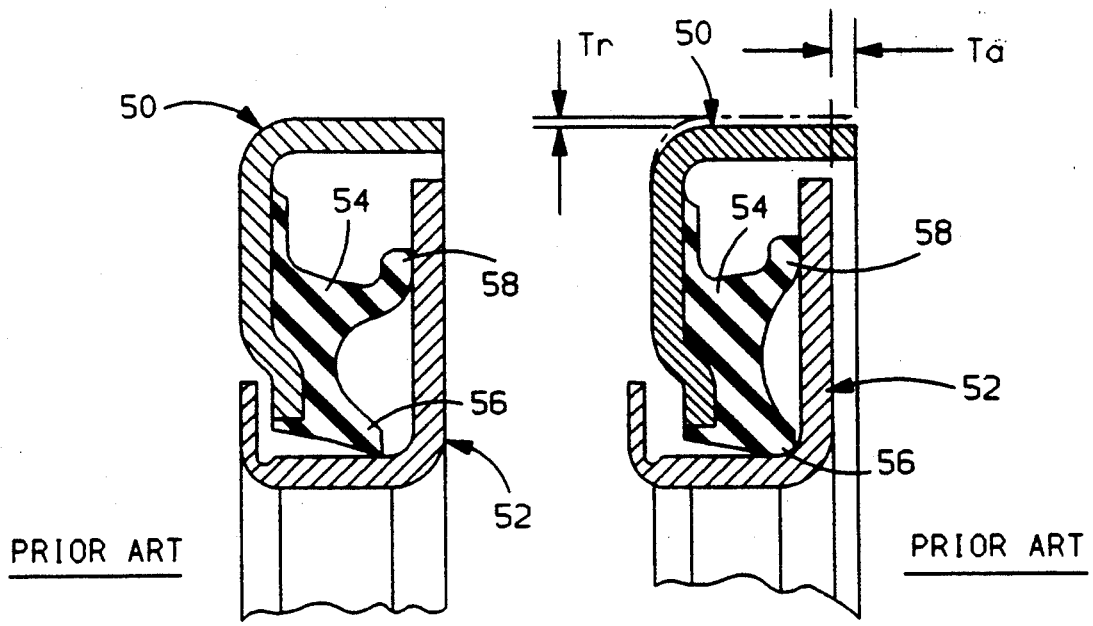
FIG. 6 PRIOR ART
FIG. 7 PRIOR ART
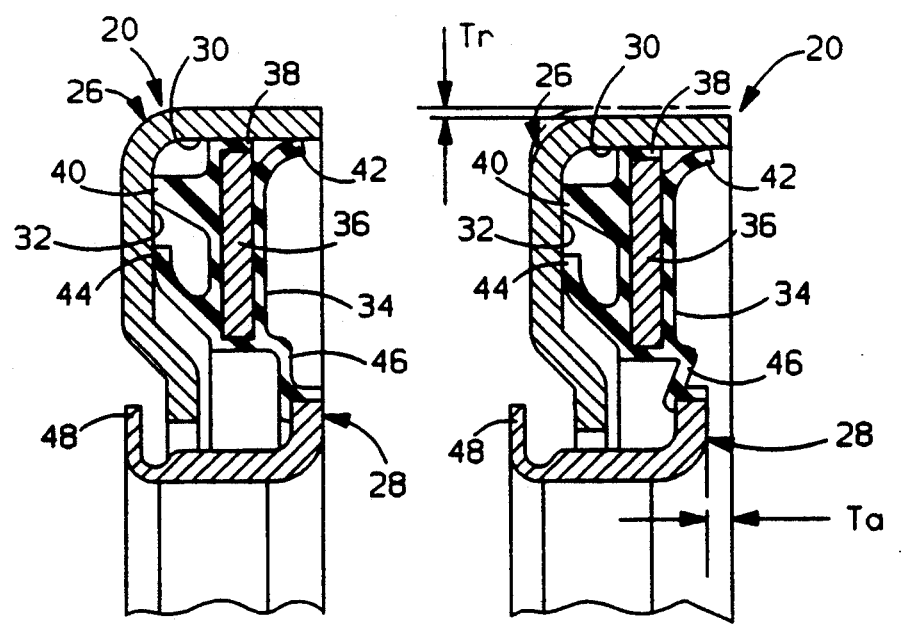
FIG. 8
FIG. 9

MULTIPLE LIP SEAL ASSEMBLY WITH IMPROVED ACCURACY

This invention relates to lip seal assemblies in general, and specifically to a seal assembly in which the seal lip maintains a substantially constant orientation relative to its sealing surface in spite of variations in the relative position of the sealing surface.

BACKGROUND OF THE INVENTION

Wheel bearings sometimes use seal assemblies that incorporate a pair of metal casings, one installed to each bearing race. Typically, an elastomer seal comprising two or more seal lips is molded to one casing, and the seal lips ride on surfaces of the other casing. An example of such a seal may be seen in U.S. Pat. No. 4,497,495 to Christiansen, assigned to the assignee of the subject invention. The sealing effectiveness depends on the the degree to which the lips are deflected out of their free state as they ride on the seal surfaces, as well as the orientation they have with the seal surfaces. There will be an ideal or nominal installation position of the seal casing relative to the other casing, at which the seal lips will be deflected to just the desired degree. However, tolerance variations, which result from stamping the casings, molding the seal, and from imperfections in the installation process, prevent the seal casings from always having the desired relative spacing and orientation. In order for the seal lips to be deflected enough when the seal casings are farther apart, extra seal lip deflection, and a change in seal lip orientation, has to be tolerated when the casings are closer. Sealing friction and wear are higher than desired when the seal lips are over deflected.

SUMMARY OF THE INVENTION

The invention provides a casing type seal with two seal lips that maintain a substantially constant deflection and orientation relative to their respective sealing surfaces.

In the embodiment disclosed, one bearing race carries a metal casing of generally L shaped cross section, providing a cylindrical sealing surface and an annular sealing surface. The other race carries a metal seal casing, which has a nominal or design intent installation position relative to the other casing. However, the seal casing is likely to actually end up beyond the nominal installed position, within a radial tolerance of the cylindrical sealing surface and within an axial tolerance of the annular sealing surface, because of the factors noted above.

The seal lips that engage the sealing surfaces are combined with special locating registers and a flexible seal hinge that cooperate to compensate for tolerance variations. A generally annular seal body of approximately the same size as the annular seal surface is designed to be rigid and substantially inflexible. Molded integrally to the seal body are a radial and axial register, which are relatively short and thick cylindrical projections that are abuttable simultaneously with their respective sealing surface. Also molded integrally to the seal body, adjacent to the registers, are radial and axial flexible seal lips. In its undeflected free state, each lip extends beyond its respective register to a degree sufficient to assure that, when the registers are abutted, the seal lips will be deflected to the proper degree, and in the proper orientation, to assure effective sealing against the sealing surfaces.

If the registers can be kept in abutment with the sealing surfaces, then the effectiveness of the seal will be maintained. This is achieved by a specially designed seal hinge integrally molded between the seal body and the stationary casing, which extends axially and radially of the casing to the seal body. Unlike a conventional seal, the hinge juncture between the body of the seal and the casing is significantly thinner and flexible. Specifically, the hinge is less flexible than the seal lips, but significantly more flexible than the rigid registers. When the seal casing is installed, the seal lips are compressed against their respective seal surfaces until the registers abut. The hinge flexes to an extent, but the seal lips are not strong enough to overpower it. Any movement of the seal casing beyond that point is reflected not in greater flexing of the seal lips, but in compensatory flexing of the hinge, since the registers are strong enough to overpower the hinge. Consequently, the seal lips remain in substantially the same, design intent orientation relative to their respective sealing surfaces, and seal effectiveness is not compromised.

It is, therefore, a general object of the invention to provide an improved multiple lip bearing seal in which the sealing effectiveness is substantially unaffected by tolerance variations.

It is another object of the invention to provide such a seal in which rigid registers, one paired with each seal lip, act as standoffs to keep the seal lips in a more or less constant flexure orientation, while tolerance variations are taken up by a seal hinge.

It is yet another object of the invention to provide a seal assembly in which the paired registers and lips have a free state difference in length which determines the seal lip deflection, a deflection that is maintained after installation by the cooperative action of the rigid registers and the flexible seal hinge.

DESCRIPTION OF THE PREFERRED EMBODIMENT

These and other objects and features of the invention will appear from the following written description, and from the drawings, in which:

FIG. 3 is a view of the two casings prior to being assembled together;

FIG. 4 is a view of the two casings in the process of being assembled together;

FIG. 5 is a view of the seal assembly completed and prior to installation, in its nominal or ideal configuration;

FIG. 6 is a view like FIG. 5, but showing a prior art seal in its nominal configuration;

FIG. 7 is a view of the FIG. 5 seal out of the nominal configuration, showing the axial and radial tolerances by comparison;

FIG. 8 is a repeat of FIG. 5 provided for comparison to FIG. 9;

FIG. 9 is a view of the FIG. 5 seal out of the nominal configuration, showing the axial and radial tolerances by comparison;

Figure 1:
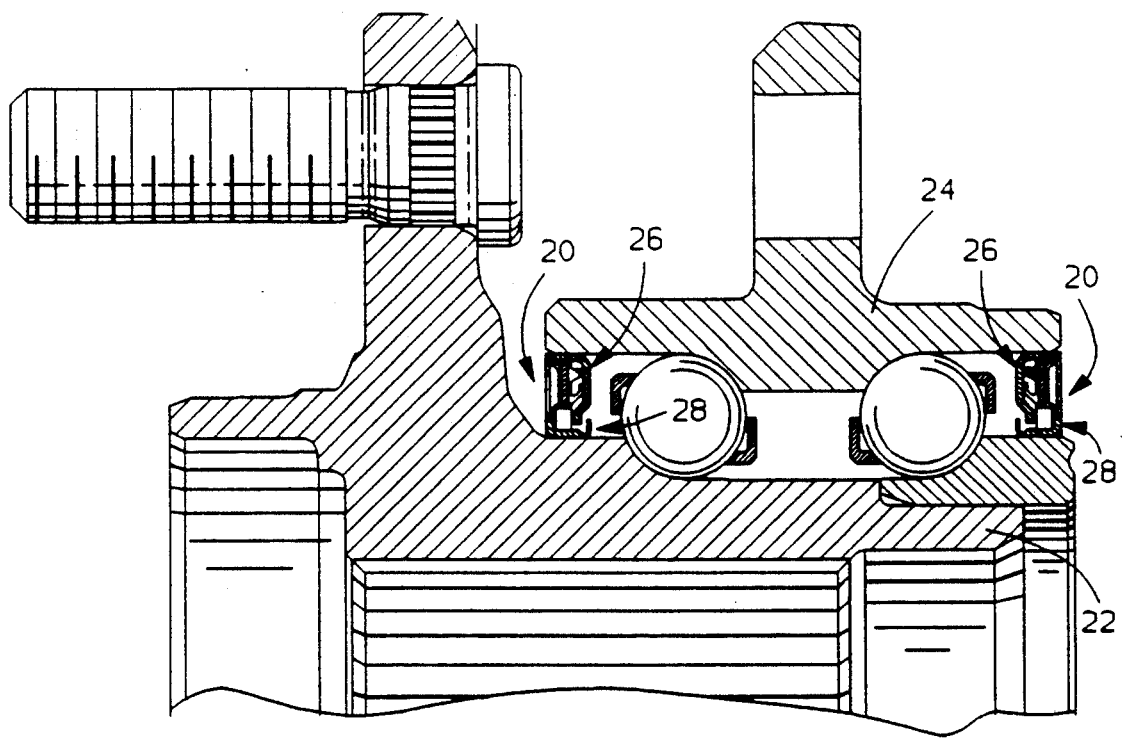
FIG. 1 is a cross sectional view of a pair of wheel bearing races incorporating a preferred embodiment of the multiple lip seal assembly of the invention.

Referring first to FIG. 1, a preferred embodiment of the invention is indicated generally at 20. There are two seal assemblies 20, each of which is installed between the two races of a vehicle wheel bearing, a rotatable inner spindle 22 and a stationary outer hub 24. Since they are identical, only one need be described in detail. Seal assembly 20 is the type that carries its sealing surfaces with it, rather than riding directly on a sealing surface integral to one of the bearing races. Specifically, assembly 20 comprises two stamped steel casings, an outer casing indicated generally at 26, and an inner casing 28. Stamped casings can be nested together to produce a unitized seal assembly that can be installed in one step. However, a pair of stamped, separately installed casings are also inherently subject to tolerance variations as far as their ultimate installed position relative to each other. Seal assembly 20 is designed to maintain sealing effectiveness in spite of such variations.

Referring next to FIGS. 3, outer casing 26 is generally L shaped in cross section, defining a cylindrical sealing surface 30 and an annular sealing surface 32. Outer casing 26 is designed to make a tight press fit with hub 24, and so forms a part of hub 24, in effect. Inner casing 28 provides the seal casing, that is, the casing to which a seal body 34 is molded. Seal body 34 is generally annular, and sized similar to annular sealing surface 32, so that it can be disposed generally parallel and coaxial thereto. Seal body 34, though molded of rubber, is intended to be substantially rigid, and is reinforced with a stiffening washer 36. Molded integrally to seal body 34 are a pair of cylindrical locating registers, a radially extending register 38 and an axially extending register 40. Radial register 38 is designed to have a diameter, in its free molded state, substantially equal to cylindrical sealing surface 30, and axial register 40 has a diameter that aligns it with annular sealing surface 32. Thus, each register 38 and 40 is properly sized to abut with a respective sealing surface 30 and 32. Unlike most rubber seal parts designed to physically contact a sealing surface, however, the rigid registers 38 and 40 are not designed, nor intended, to bend or deflect, or to provide a seal per se, though they do add to the sealing effect. Instead, they are designed to cooperate with other structure described next.

Figure 2:
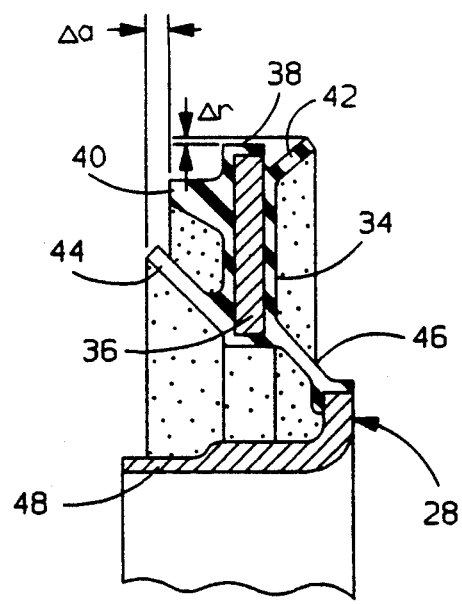
FIG. 2 is an enlarged view of just the seal casing and molded seal, showing the relative free state locations and orientations of the paired registers and seal lips.

Referring next to FIGS. 2 and 3, seal body 34 is also molded with a pair of flexible seal lips, a radial seal lip 42 and axial seal lip 44, each adjacent to a respective register 38 and 40. Each seal lip 42 and 44 slopes toward a respective seal surface 30 and 32, rather than being substantially square thereto, as are registers 38 and 40. Specifically, radial seal lip 42 slopes axially outwardly, and axial seal lip 44 slopes radially outwardly, and so are best oriented to exclude contaminant entry. Most importantly, each seal lip 42 and 44 extends past its adjacent register 38 and 40 by a differential, indicated at $\Delta r$ and $\Delta a$, which serves a purpose described below. Seal body 34 is not directly molded to seal casing 28, as is conventionally done. Instead, the juncture between seal body 34 and seal casing 28 is a resilient seal hinge 46, which slopes in the same direction as axial seal lip 44, and is significantly thinner than seal body 34. Seal hinge 46 is flexible, much more so than the registers 38 and 40, but is deliberately made stiffer than the sealing lips 42 and 44 added together. The degree or amount to which hinge 46 can flex, as distinct from its flexibility per se, is related to the characteristics of the installation of the casings 26 and 28, described below.

Referring next to FIGS. 4 and 5, the initial installation step for seal assembly 20 is illustrated. It would be possible to install the casings 26 and 28 separately and independently of one another to hub 24 and spindle 22. In practice, it is easier to first nest the casings 26 and 28 together as a unit, as shown in FIG. 4, and then roll up a flange 48 from casing 28 to retain the two together, as shown in FIG. 5. Then, the entire assembly 20 can be installed at once by pushing it axially between the spindle 22 and hub 24. It will be understood that the location and orientation of seal lips 42 and 44 relative to outer casing 26, while somewhat constrained by flange 48, is not fixed, as it is post installation. However, FIG. 5 shows the casings 26 and 28 in their nominal, ideal installation position. When each register 38 and 40 is abutted with its respective sealing surface 30 and 32, then its adjacent seal lip 42 and 44 will be in contact with and deflected by its respective sealing surface 30 and 32. When that condition obtains, the differentials $\Delta r$ and $\Delta a$ referred to above are sufficient to assure that the degree of deflection of the lips 42 and 44 is, in turn, sufficient to assure good sealing effectiveness. That desired condition is maintained post installation.

Referring next to FIGS. 8 and 9, the post installation situation is illustrated. When the casings 26 and 28 are fixed in place, cylindrical surface 30 is radially spaced from spindle 22, while annular surface 32 is axially spaced. In the FIG. 8 nominal installation position, the casings 26 and 28 are just close enough together that the registers 38 and 40 are able to abut their respective sealing surfaces 30 and 32. That abutment is achieved in fact, because the hinge 46 is stiffer than the seal lips 42 and 44, as noted above, so the hinge will deflect the lips 42 and 44, not the reverse. The casings 26 and 28 may be closer together than the ideal, however, due to many factors, including how accurately the casings 26 and 28 are stamped and where they actually reside on the hub 24 and spindle 22. It is simplest here to describe those tolerances in terms of the seal casing 28 being closer to the other casing 26, beyond the nominal position. Thus, by comparing FIGS. 8 to FIG. 9, it is seen that casing 28 has moved closer to casing 26 by the axial tolerance Ta, and radially closer by the tolerance Tr. It will be understood, of course, that the reference frame for measuring the relative distances of two components is arbitrary, and the situation at different points of cross section through the casings 26 and 28 may be different. The response of seal assembly 20 to such tolerance variations, and how it is improved, may best be seen by comparison to the response of the conventional seal referred to above.

Referring next to FIGS. 6 and 7, the prior art seal referred to above is comprised of a stationary outer casing 50, rotating inner casing 52, a molded rubber seal body 54, radial seal lip 56 and axial seal lip 58. The casings 50 and 52 are subject to the same radial and axial tolerance variation in post installation position, also indicated at Tr and Ta. In this case, it is the outer casing 50 that provides the seal casing. The seal body 54 is directly molded to the outer casing 50 and comprises the thickest, stiffest part of the seal. Since the juncture between the seal body 54 is far more thick and rigid than the seal lips 56 and 58, they are forced to flex to a greater degree if the casings 50 and 52 are closer together than the nominal spacing, as illustrated in FIG. 7.

Greater deflection in the seal lips 56 and 58 puts more area into contact with the other casing 52, increasing their friction and torque. Wear is increased, and the seal lips 56 and 58 no longer have their design intent orientation relative to the other casing 52.

Referring again to FIGS. 8 and 9, the response of seal assembly 20 to the same conditions is compared. At the nominal installation position of FIG. 8, seal hinge 46 is flexed out of its free state position, but the fact that it is more rigid than the seal lips 42 and 44 assures that they will deflect until the registers 38 and 40 hit the respective sealing surfaces. And, as noted above, the seal lips 42 and 44 will then be in their design intent orientation. The ideal deflection of seal lips 42 and 44 per se is a matter of good design practice. What is different here is the way that ideal deflection is maintained in the face of tolerance variations. When the casings 26 and 28 are closer than the ideal spacing, as shown in FIG. 9, the stiffer registers 38 and 40 now overpower the less stiff hinge 46, which flexes radially in and axially out. Hinge 46 is made long enough to have enough flex to accommodate Ta and Tr. As a consequence, the position of seal lips 42 and 44 relative to their respective sealing surfaces 30 and 32 does not change, and no more of their area contacts the sealing surfaces 30 and 32, as is the case with seal lips 56 and 58.

Figure 10:
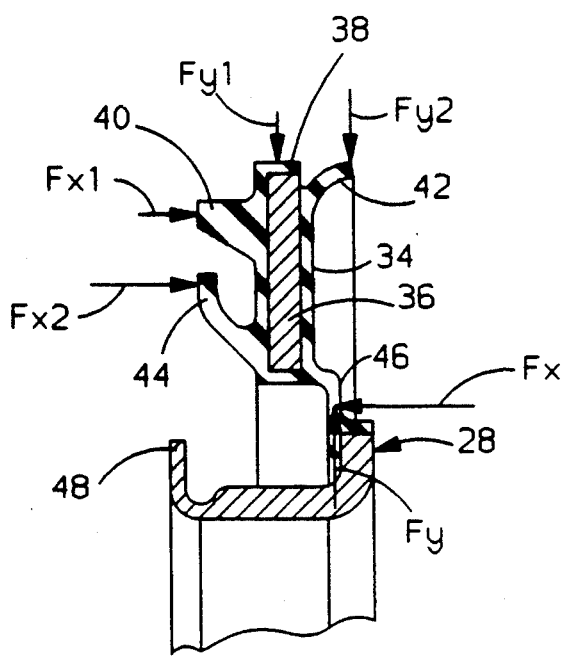
FIG. 10 is a view like FIG. 2, showing the various forces acting on the seal.
Figure 11:
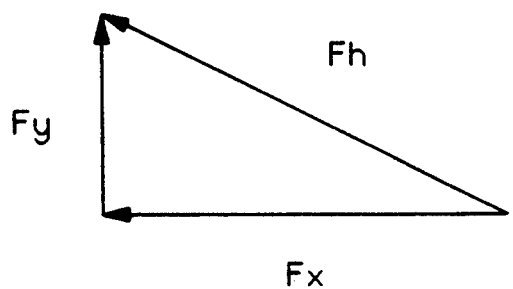
FIG. 11 is a schematic view of the sums of the various force components acting on seal.

Referring next to FIGS. 10 and 11, the force balance that exists when the seal assembly 20 is in its nominal position is illustrated. The radial register and lip pair 38 and 42 produce radial force components labeled Fy1 and Fy2, and the axial register and lip pair 40 and 44 produce axial force components labeled Fx1 and Fx2. These are balanced in the hinge 46 by opposing forces Fy and Fx which, as shown in FIG. 11, add to create a total force in hinge 46 Fh. When the hinge 46 is deflected more, the forces in the registers 38 and 40, Fx1 and Fy1, will increase, as will the total force Fh, but no more area of the registers 38 and 40 will contact the sealing surfaces 30 and 32, whatever the force. The forces in the seal lips 42 and 44, Fx2 and Fy2, will remain substantially constant. Thus, the sealing effectiveness of the lips 42 and 44 is substantially unaffected. This maintenance of seal effectiveness provided by the cooperation between the stiff registers 38 and 40 and the less stiff hinge 46 has a dynamic component, as well. That is, any installation misalignment of the casings 26 and 28 that would otherwise be reflected in wow and flutter of the seal lips 42 and 44 will now result only in a dynamic, compensatory flexing of hinge 46.

Variations of the preferred embodiment would be possible. The sealing surfaces 30 and 32 could be ground integrally into the hub 24, rather than being made part of a seal casing 28. The same design principles could be applied to produce a seal with only one lip and accompanying register, or with more than two. Therefore, it will be understood that it is not intended to limit the invention to just the embodiment disclosed.

I claim:

1. An improved bearing seal assembly for use between a first bearing race that has a sealing surface spaced from a second bearing race, comprising,
   a seal casing adapted to be installed to said second race within a tolerance beyond a nominal position relative to said sealing surface,
   a substantially rigid seal body oriented generally coaxial to said sealing surface, said seal body having a generally cylindrical, substantially rigid register extending therefrom and abuttable with said sealing surface when said seal casing is at said nominal position,
   said seal body further having a flexible seal lip adjacent to and extending beyond said register, so that, when said register is abutted with said sealing surface, said seal lip is assured of being deflected against said sealing surface, and,
   a flexible seal hinge joining said seal body to said seal casing and having a rigidity greater than said seal lip but less than said register and having a degree of flexibility at least equal to said predetermined tolerance,
   whereby, when said seal casing is located beyond said nominal position and within said tolerance, said hinge is flexed by said register, thereby allowing said seal lip to remain deflected substantially the same relative to said sealing surface.

2. An improved multiple lip bearing seal assembly for use between a first bearing race that has a generally cylindrical sealing surface radially spaced from a second bearing race and a generally annular sealing surface axially spaced from said second bearing race, said seal assembly comprising,
   a seal casing adapted to be installed to said second race within a radial tolerance beyond a nominal position relative to said cylindrical sealing surface and within an axial tolerance beyond a nominal position relative to said annular sealing surface,
   a substantially rigid, generally annular seal body oriented generally coaxial to said annular sealing surface, said seal body having a generally cylindrical, substantially rigid radial register extending radially therefrom and abuttable with said cylindrical sealing surface when said seal casing is at said nominal position and a generally cylindrical, substantially rigid axial register extending axially therefrom and abuttable with said annular sealing surface when said seal casing is at said nominal position,
   said seal body further having a flexible radial seal lip adjacent to and extending beyond said radial register and a flexible axial seal lip adjacent to extending beyond said axial register, so that, when said registers are abutted with their respective sealing surfaces, said respective seal lips are assured of being deflected against said respective sealing surfaces, and,
   a flexible seal hinge joining said seal body to said seal casing and having a rigidity greater than said seal lips but less than said registers and having a degree of flexibility at least equal to said predetermined axial and radial tolerances,
   whereby, when said seal casing is located beyond said nominal position and within said axial and radial tolerances, said hinge is flexed radially and axially by said registers, thereby allowing said seal lips to remain deflected substantially the same relative to said sealing surfaces.

3. An improved multiple lip bearing seal assembly for use between a first and second bearing race, comprising,
   a first casing adapted to be installed to said first race with a generally cylindrical sealing surface radially spaced from said second race and a generally annular sealing surface axially spaced from said second race,
   a second casing adapted to be installed to said second race within a radial tolerance beyond a nominal position relative to said cylindrical sealing surface and within an axial tolerance beyond a nominal position relative to said annular sealing surface, a substantially rigid, generally annular seal body oriented generally coaxial to said annular sealing surface, said seal body having a generally cylindrical, substantially rigid radial register extending radially therefrom and abuttable with said cylindrical sealing surface when said second casing is at said nominal position and a generally cylindrical, substantially rigid axial register extending axially therefrom and abuttable with said annular sealing surface when said second casing is at said nominal position, said seal body further having a flexible radial seal lip adjacent to and extending beyond said radial register and a flexible axial seal lip adjacent to extending beyond said axial register, so that, when said registers are abutted with their respective sealing surfaces, said respective seal lips are assured of being deflected against said respective sealing surfaces, and, a flexible seal hinge joining said seal body to said second casing and having a rigidity greater than said seal lips but less than said registers and having a degree of flexibility at least equal to said predetermined axial and radial tolerances, whereby, when said second casing is located beyond said nominal position and within said axial and radial tolerances, said hinge is flexed radially and axially by said registers, thereby allowing said seal lips to remain deflected substantially the same relative to said sealing surfaces.

* * * * *